US009013073B2

(12) United States Patent
Lee et al.

(10) Patent No.: US 9,013,073 B2
(45) Date of Patent: Apr. 21, 2015

(54) SYSTEM AND METHOD FOR BALANCING INPUT CURRENT WITH PARALLEL POWER SUPPLIES

(75) Inventors: Hsin-Chih Lee, Houston, TX (US); Daniel Humphrey, Houston, TX (US); Zachary J. Gerbozy, Spring, TX (US); David Paul Mohr, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 205 days.

(21) Appl. No.: 13/387,169

(22) PCT Filed: Apr. 22, 2010

(86) PCT No.: PCT/US2010/032031
§ 371 (c)(1),
(2), (4) Date: Jan. 26, 2012

(87) PCT Pub. No.: WO2011/133156
PCT Pub. Date: Oct. 27, 2011

(65) Prior Publication Data
US 2013/0026832 A1    Jan. 31, 2013

(51) Int. Cl.
*G05F 1/625* (2006.01)
*H02J 1/10* (2006.01)

(52) U.S. Cl.
CPC ........................................ *H02J 1/10* (2013.01)

(58) Field of Classification Search
CPC ...................................................... G05F 1/625
USPC ................ 363/65; 307/151, 53; 700/286–298
See application file for complete search history.

(56) References Cited

U.S. PATENT DOCUMENTS 4,618,779 A * 10/1986 Wiscombe ...................... 307/60
4,924,170 A    5/1990 Henze
5,253,155 A * 10/1993 Yamamoto ...................... 363/71
(Continued)

FOREIGN PATENT DOCUMENTS

CN        1287398        3/2001
CN        1564420        1/2005
(Continued)

OTHER PUBLICATIONS

Chattopadhyay, Souvik. and Ramanarayanan, V., A Voltage-Sensorless Control Method to Balance the Input Currents of a Three-Wire Boost Rectifier Under Unbalanced Input Voltages Condition, Apr. 2005, IEEE Transactions on Industrial Electronics, vol. 52, Issue: 2, pp. 386-398.*

(Continued)

*Primary Examiner* — Jared Fureman
*Assistant Examiner* — Brett Squires
(74) *Attorney, Agent, or Firm* — Greer, Burns & Crain, Ltd.

(57) ABSTRACT

A method for balancing input current with at least two parallel power supplies, including the steps of defining an input current difference tolerance, measuring input current from the at least two parallel power supplies, calculating an absolute value of the difference between the two measured input currents, and when the calculated value exceeds the tolerance, performing the subset of steps including employing an adjustment technique to calculate new operating parameters for the two power supplies, configuring the two power supplies with the new operating parameters, and repeating the steps above except for the defining step.

20 Claims, 5 Drawing Sheets

(56) References Cited

U.S. PATENT DOCUMENTS

| | | |
|---|---|---|
| 5,675,480 A | 10/1997 | Stanford |
| 5,834,925 A | 11/1998 | Chesavage |
| 6,118,674 A | 9/2000 | Higashi |
| 6,157,555 A | 12/2000 | Hemena |
| 6,320,771 B1 | 11/2001 | Hemena et al. |
| 7,312,962 B1 * | 12/2007 | Zansky et al. .................. 361/30 |
| 7,355,372 B2 | 4/2008 | Huang et al. |
| 7,394,674 B2 | 7/2008 | Huang |
| 7,411,256 B2 | 8/2008 | Hashimoto |
| 7,528,552 B2 | 5/2009 | Chan et al. |
| 8,288,888 B2 * | 10/2012 | Hinatsu et al. .................. 307/24 |
| 2005/0078024 A1 | 4/2005 | Harrington |
| 2009/0009005 A1 | 1/2009 | Luo et al. |

FOREIGN PATENT DOCUMENTS

| | | |
|---|---|---|
| CN | 1835368 | 9/2006 |
| DE | 102004021782 A1 | 12/2005 |
| EP | 1148609 | 10/2001 |
| JP | 05189065 | 7/1993 |
| WO | WO 2010112094 A1 * | 10/2010 |

OTHER PUBLICATIONS

IPO, Examination Report mailed Jan. 30, 2015, GB1202601.9, 1pp.

* cited by examiner

SYSTEM AND METHOD FOR BALANCING INPUT CURRENT WITH PARALLEL POWER SUPPLIES

TECHNICAL FIELD

The field of the invention is power supply devices.

BACKGROUND ART

The present invention relates generally to power supplies, and more specifically to systems and methods for balancing input current with parallel power supplies.

A power supply unit is a component that supplies power to other components in an electronic device (e.g., a computer). More specifically, a power supply unit is typically designed to convert general-purpose alternating current (AC) electric power to useable low-voltage direct current (DC) power for internal components of the electronic device.

Traditional power supplies have a single output that allows two or more power converters to be connected in parallel so as to guarantee equitable sharing of the output currents of each power converter. For this purpose, the power supply is controlled by a regulating circuit whose command signal depends on the currents measured at the outputs from each converter to control the power cutoff circuits at the input. However, when similar output voltages from two or more converters with multiple outputs are connected in parallel, it is difficult to guarantee equitable sharing of the output currents among the converters. Further, while such solutions aim to match output current sharing, there is little or no guarantee of properly regulating input current sharing.

DISCLOSURE OF INVENTION

The invention provides a method for balancing input current with at least two parallel power supplies, including the steps of defining an input current difference tolerance, measuring input current from the at least two parallel power supplies, calculating an absolute value of the difference between the two measured input currents, and when the calculated value exceeds the tolerance, performing the subset of steps including employing an adjustment technique to calculate new operating parameters for the two power supplies, configuring the two power supplies with the new operating parameters, and repeating the steps above except for the defining step.

MODES FOR CARRYING OUT THE INVENTION

Under the traditional approaches to load sharing as discussed above, there is no way to ensure equal power or current entering parallel power supplies. This imbalance results from manufacturing variation and from differences within different types of power supplies, among other factors. However, digitally balancing the input to the power supplies allows users to reclaim expensive unutilized datacenter capacity.

Embodiments of the present invention provide for systems and methods of balancing input current with parallel power supplies by using digital feedback techniques. Such techniques allow users to reclaim valuable unutilized datacenter capacity by exactly matching phase current between multiple power supplies.

By utilizing power supply microcontrollers, hardware and/or software can be implemented to control the output voltage by changing parameters in microcontroller registers. Further, a software algorithm can be run on or by the microcontroller to adjust for the output voltage when there is an input load share difference.

Before discussing particular features of example embodiments in detail, it will be appreciated that the present invention may be embodied in a method, system, and/or computer program product. For example, a method according to one embodiment may be carried out by one or more users using computers or by one or more computers executing steps of the invention, and a program product of the invention may include computer executable instructions stored on a tangible memory medium (that may be, for example, non-volatile memory, a magnetic or optical disk or other magnetic or optical media, electrical, chemical, electrochemical, or other tangible media) that when executed by one or more computers cause one or more computers to carry out steps of a method of the invention. The program instructions and methods of embodiments of the invention transform data, cause results of computations and/or data to be stored in one or more memories and/or to be displayed on displays, with such storage and/or display causing a transformation of physical elements such as a physical alteration to a memory media that may be read to recover the stored data.

Figure 1:
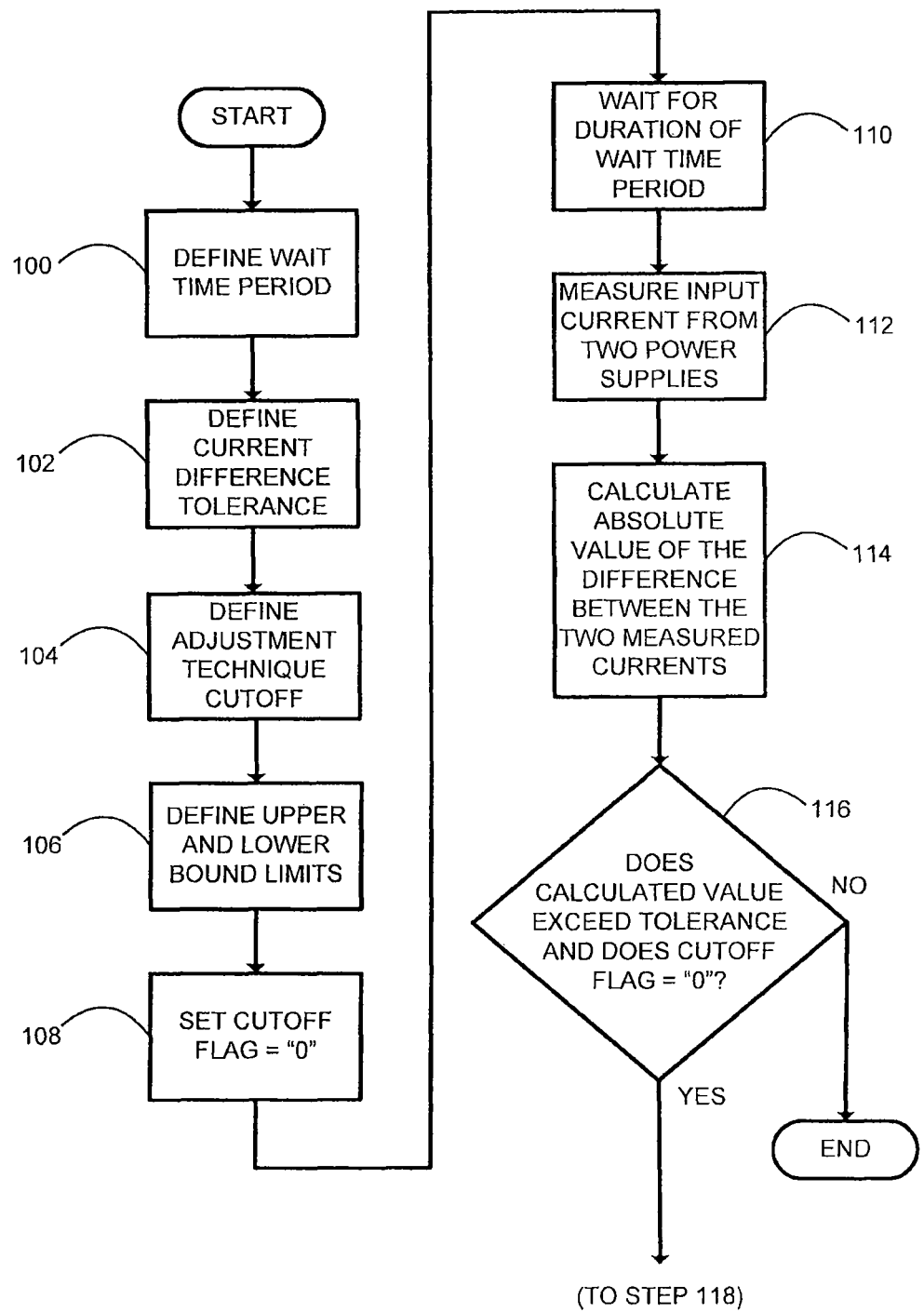
FIG. 1 is a flowchart illustrating the operating steps of a method embodiment of the present invention (part 1 of 3)
Figure 2:
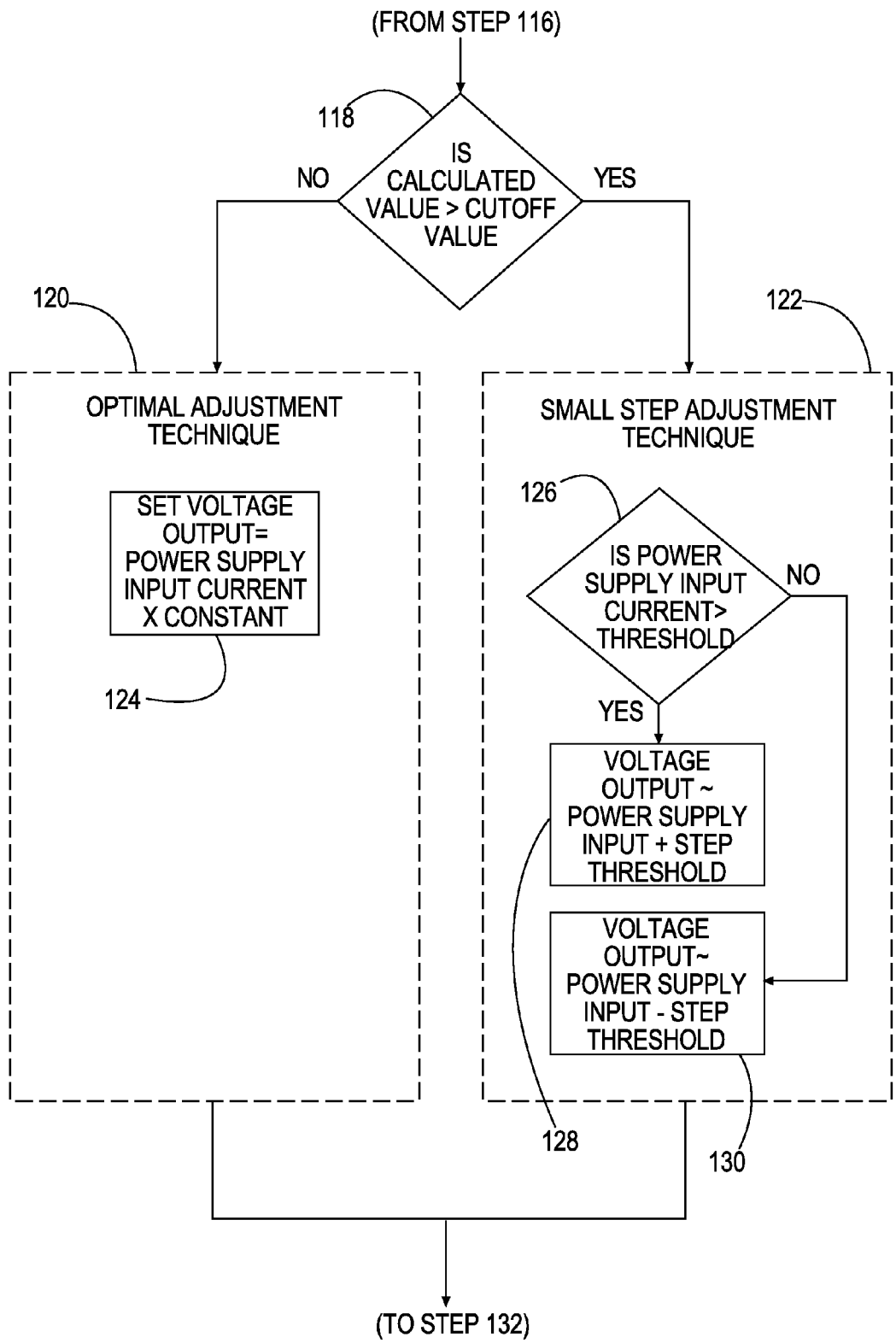
FIG. 2 is a flowchart illustrating the operating steps of a method embodiment of the present invention (part 2 of 3)
Figure 3:
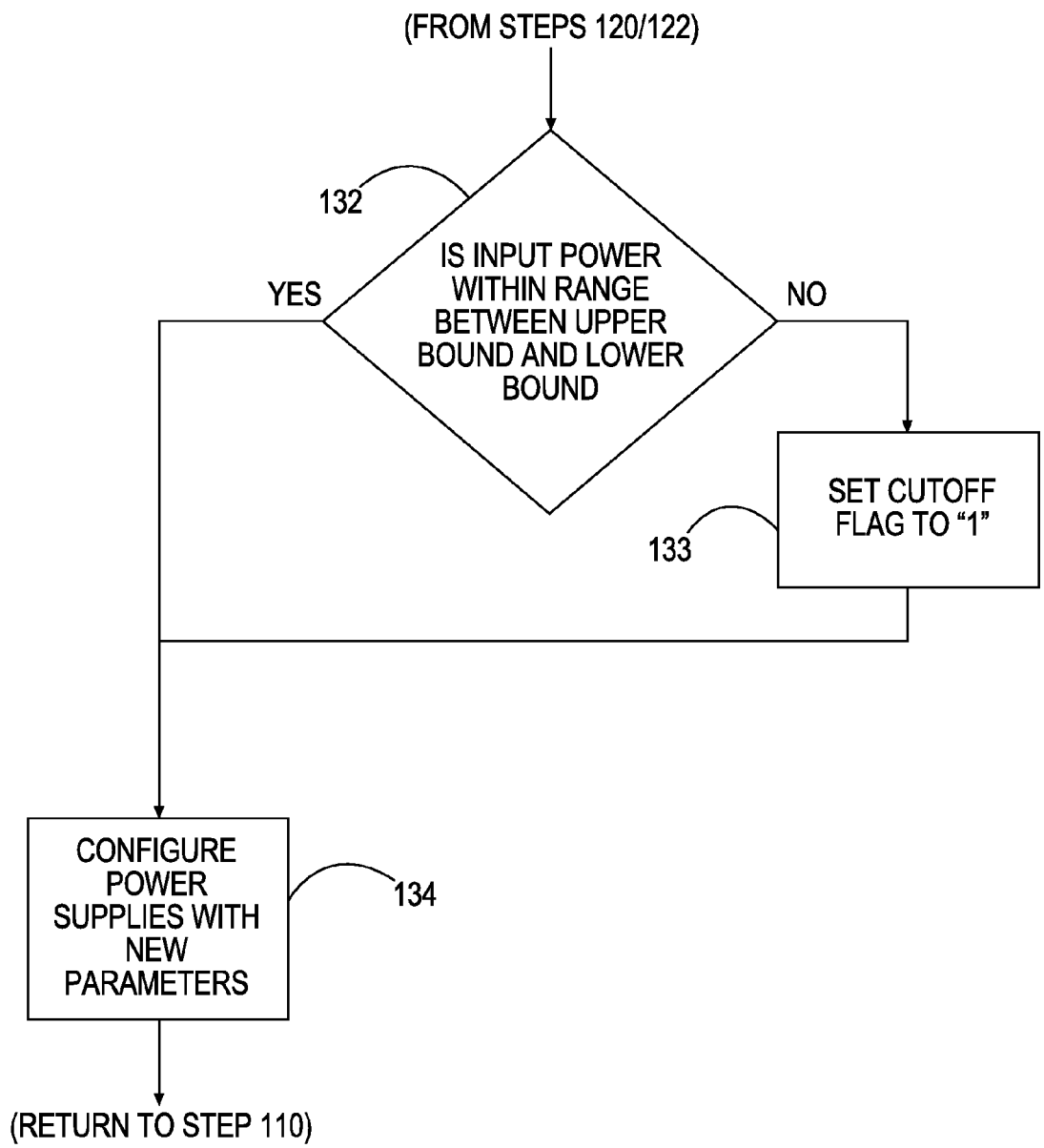
FIG. 3 is a flowchart illustrating the operating steps of a method embodiment of the present invention (part 3 of 3)

An example of such an algorithm, which provides for balancing input current with parallel power supplies, is shown in FIG. 1. Initially, one or more parameters are set to tailor behavior of the system depending on user's desired output, tolerance levels, and the like. As such, in step 100, a wait time period is defined. The wait time period provides a grace period for input current to stabilize after a load change. This period can be set by the user or automatically derived by the system. An example wait time period is one second. Next, in step 102, an input current difference tolerance is defined. This defines a tolerance (i.e., an acceptable difference between the two input currents, which should be regarded as sufficiently equal currents). The lower the tolerance level, the more likely there are to be more iterations of modifying the input currents to reach the desired equality. An example input current difference tolerance is 50 mA. Next, in step 104, an adjustment technique cutoff is defined. This cutoff is used to determine which of at least two different adjustment methods is used for the input currents to bring them closer together. Once a certain cutoff value is determined, the difference between the two input currents in calculated and compared against this cutoff value. If the difference is higher than the cutoff, a first technique is employed. Alternatively, if the difference is less than the cutoff, a second technique is employed.

Notably, the described system is not limited to one or both of the two described techniques. Instead, multiple techniques could be used with multiple cutoff values defining ranges, which provide for selection of a particular technique. Next, in step 106, upper and lower bound voltage levels are defined, and in step 108, a cutoff flag is initiated to "0." These bound limits specify the physical limitations of the power supply (i.e., the maximum and minimum voltages that the supply is capable or allowed to be running at), while the cutoff flag indicates whether those bounds have been exceeded. When the system initiates, the cutoff flag is set to "0" to indicate that the bounds have not been exceeded. When the bounds are later checked, the flag is then again set accordingly to the readings associated with the power supply.

Once the initialization 100-108 steps are completed, control is moved to the operational steps of the system. In step 110, the system waits the duration of the wait time period (i.e., for input current stabilization as discussed above). Next, in step 112, input current from the two power supplies is measured. Then, in step 114, an absolute value of the difference between the two measured input currents is calculated. If, in step 116 the calculated value exceeds the tolerance and the cutoff flag="0," then the following subset of steps are performed. First, an adjustment technique is applied to calculate new operating parameters for the two power supplies. As discussed earlier, the particular technique is selected depending on the calculated value as compared to the adjustment technique cutoff value. In the example embodiment shown, if the calculated value is greater than the cutoff (as tested in step 118), an optimal adjustment technique is employed (step 120), otherwise, a small step adjustment technique is employed (step 122).

The optimal adjustment technique uses an equation to map from input current to output voltage. If the power supply is using droop sharing, the relationship between output voltage and output current is linear. As such, the output voltage is set to the output current multiplied by a constant (step 124). The small step adjustment technique "steps" the output voltage to obtain finer compensation. The system using this algorithm determines which method to use by a set point variable. Notably, when small adjustments are needed, the small step technique is preferably used. The small step technique increments a discrete set of voltage levels on a power supply to incrementally adjust the input sharing. As such, if the power supply input current is greater than a threshold (as tested in step 126), the voltage output is incremented to the next available discrete level. Such incrementing can be implemented by either increasing (step 128) or decreasing (step 130) the voltage (depending on whether load of the power supply is intended to be increased or decreased). These steps facilitate the "stepping" process, which incrementally adjusts the input sharing. Notably, small step is commonly used in connection with droop sharing protocols.

Once the adjustment technique has been applied, the capability of the power supply is tested. At step 132, if the output voltage from the two power supplies are equal to or outside a range between the upper bound voltage level and the lower bound voltage level, the cutoff flag is set to "1," (step 133) indicating that the power supply is beyond the accepted voltage level range. In either case, the two power supplies are then configured with the new operating parameters (step 134) and the steps above are repeated except for the defining step (i.e., control returns to step 110).

As described above, with traditional power supplies, sharing is done at the outputs of the power supplies. This often causes issues since there are multiple vendors of power supplies and who make power supplies with varying designs. Manufacturing variance may provide for differences in one or more operating variables. The present invention however, digitally compensates two or more power supplies' output sharing such that the system shares the input rather than the output. In other words, the system alters the output so that it has consistent input. Through one or more iterations of the method described above, the system reaches the desired consistent input.

Figure 4:
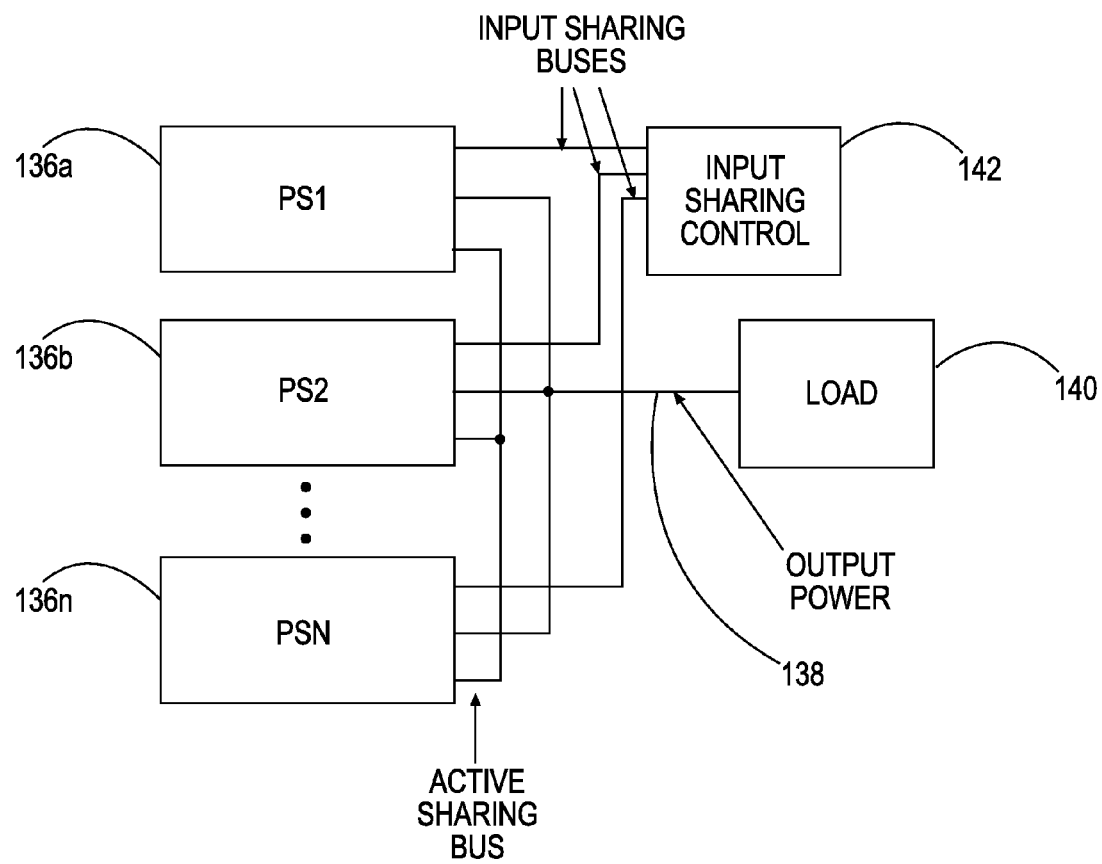
FIG. 4 is a system diagram of an embodiment of the present invention.

As noted, the present invention is not limited to two power supplies, but can be utilized in an environment having two or more such parallel power supplies. A system diagram showing N power supplies (136) is shown in FIG. 4. In the embodiment shown, multiple power supplies are used in conjunction with each other to provide for a common output power (138) to the load (140). The input sharing control mechanism (142) (i.e., employing the methods described above), uses the input sharing buses to regulate the output power sent to the load.

Figure 5:
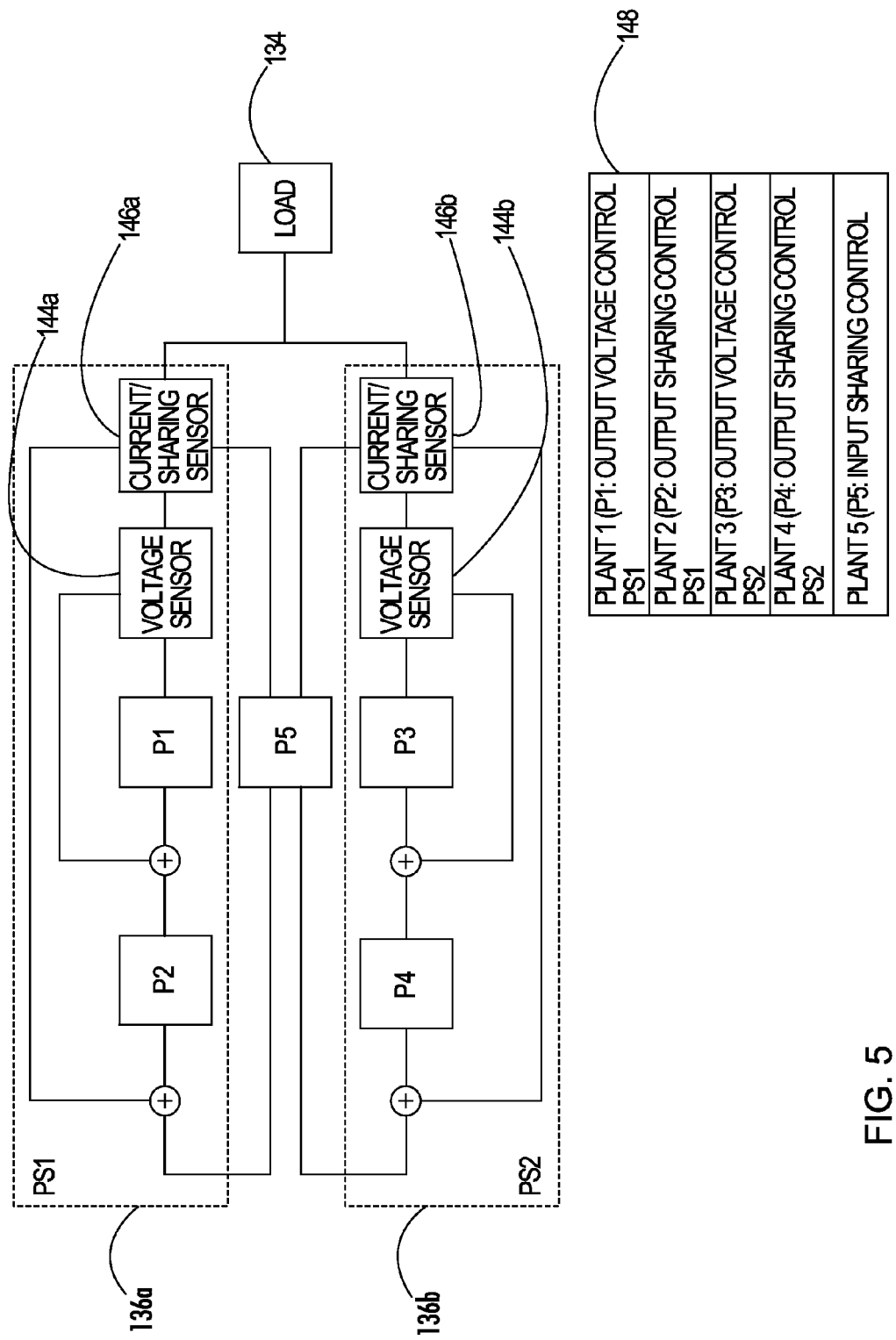
FIG. 5 is a control diagram of an embodiment of the present invention.

Finally, the example embodiment is shown by way of a control diagram in FIG. 5. In each power supply 136*a/b*, monitoring of the voltage and current is performed by an associated sensor 144*a/b*, 146*a/b* respectively. The table 148 specifies which of the plants are associated with which output voltage/sharing controls.

While particular embodiments of a system and method for balancing input current with parallel power supplies have been described herein, it will be appreciated by those skilled in the art that changes and modifications may be made thereto without departing from the invention in its broader aspects and as set forth in the following claims.

What is claimed is:

1. A method for balancing input current to at least two parallel power supplies, comprising the steps of:
    defining an input current difference tolerance;
    measuring input current to the at least two parallel power supplies;
    calculating an absolute value of the difference between the two measured input currents; and
    when the calculated value exceeds the tolerance, performing a subset of steps comprising:
        employing an adjustment technique to calculate new operating parameters for the two power supplies;
        configuring the two power supplies with the new operating parameters; and
        repeating the steps above except for the defining step.

2. The method of claim 1 further comprising the steps of:
    defining a wait time period; and
    waiting the duration of the wait time period before measuring input current to the two power supplies.

3. The method of claim 2 wherein the wait time period is one second.

4. The method of claim 1 wherein the adjustment technique is an optimal adjustment technique and wherein the new operating parameters include a voltage output which is set using a linear equation such that the voltage output equals a power supply output current multiplied by a predetermined constant.

5. The method of claim 1 wherein the adjustment technique is a small step adjustment technique, the new operating parameters include a voltage output, and wherein a predetermined step increment and a predetermined step threshold are set, the method further comprising the steps of:
    when the measured input current to one of the power supplies is greater than a threshold, incrementing the voltage output to the next available discrete level.

6. The method of claim 5 wherein incrementing the voltage output is implemented by increasing the voltage, thereby adding load to the power supply.

7. The method of claim 5 wherein incrementing the voltage output is implemented by decreasing the voltage, thereby decreasing load from the power supply.

8. The method of claim 1 further comprising the steps of:
    defining an adjustment technique cutoff;
    if the calculated value is greater than the cutoff, employing an optimal adjustment technique, otherwise, employing a small step adjustment technique.

9. The method of claim 1 further comprising the steps of:
defining an upper bound voltage level and a lower bound voltage level; and
performing the subset of steps only if the calculated value exceeds the tolerance and the output voltage from the two power supplies are within a range between the upper bound voltage level and the lower bound voltage level.

10. A computer program product for balancing input current to at least two parallel power supplies, the program product comprising executable instructions stored on a tangible non-transitory medium, the instructions when executed causing execution of the following steps:
defining an input current difference tolerance;
measuring input current to the at least two parallel power supplies;
calculating an absolute value of the difference between the two measured input currents; and
when the calculated value exceeds the tolerance, performing a subset of steps comprising:
employing an adjustment technique to calculate new operating parameters for the two power supplies;
configuring the two power supplies with the new operating parameters; and
repeating the steps above except for the defining step.

11. The computer program product of claim 10 wherein the instructions are loaded into a microprocessor associated with each of the at least two parallel power supplies.

12. The computer program product of claim 10 wherein the instructions when executed further cause execution of the following steps:
defining a wait time period; and
waiting the duration of the time period before measuring input current to the two power supplies.

13. The computer program product of claim 12 wherein the wait time period is one second.

14. The computer program product of claim 10 wherein the adjustment technique is an optimal adjustment technique and wherein the new operating parameters include a voltage output which is set using a linear equation such that the voltage output equals a power supply output current multiplied by a predetermined linear constant.

15. The computer program product of claim 10 wherein the adjustment technique is a small step adjustment technique wherein the operating parameters include a voltage output, a predetermined step increment and a predetermined step threshold are set, and wherein the instructions when executed further causing execution of the following steps:
if the measured input current to one of the power supplies is greater than the threshold, incrementing the voltage output to the next available discrete level.

16. The computer program product of claim 10 wherein the instructions when executed further cause execution of the following steps:
defining an adjustment technique cutoff;
if the calculated value is greater than the cutoff, employing an optimal adjustment technique, otherwise, employing a small step adjustment technique.

17. A system for balancing input current, comprising:
at least two parallel power supplies;
a microprocessor associated with the at least two parallel power supplies and configured to execute the following steps:
defining an input current difference tolerance;
measuring input current to the two power supplies;
calculating an absolute value of the difference between the two measured input currents; and
when the calculated value exceeds the tolerance, performing a subset of steps comprising:
employing an adjustment technique to calculate new operating parameters for the two power supplies;
configuring the two power supplies with the new operating parameters; and
repeating the steps above except for the defining step.

18. The system of claim 17 wherein the adjustment technique is an optimal adjustment technique and wherein the new operating parameters include a voltage output which is set using a linear equation such that the voltage output equals a power supply input current multiplied by a predetermined linear constant.

19. The system of claim 17 wherein the adjustment technique is a small step adjustment technique, the operating parameters include a voltage output, and wherein a predetermined step increment and a predetermined step threshold are set, and wherein the microprocessor is further configured to perform the steps of:
if the measured input current to one of the power supplies is greater than the threshold, incrementing the voltage output to the next available discrete level.

20. The method of claim 17 wherein the microprocessor is further configured to performs the steps of:
defining an upper bound voltage level and a lower bound voltage level; and
performing the subset of steps only if the calculated value exceeds the tolerance and the output voltage from the two power supplies are within a range between the upper bound voltage level and the lower bound voltage level.

* * * * *

UNITED STATES PATENT AND TRADEMARK OFFICE
CERTIFICATE OF CORRECTION

| | |
|---|---|
| PATENT NO. | : 9,013,073 B2 |
| APPLICATION NO. | : 13/387169 |
| DATED | : April 21, 2015 |
| INVENTOR(S) | : Hsin-Chih Lee et al. |

It is certified that error appears in the above-identified patent and that said Letters Patent is hereby corrected as shown below:

In the claims

In column 6, line 41, in Claim 20, delete "method" and insert -- system --, therefor.

Signed and Sealed this
Twenty-seventh Day of October, 2015

Michelle K. Lee
*Director of the United States Patent and Trademark Office*